US012143786B2

(12) United States Patent
Yang et al.

(10) Patent No.: US 12,143,786 B2
(45) Date of Patent: Nov. 12, 2024

(54) ELECTRONIC DEVICE HAVING MULTIPLE SPEAKERS CONTROLLED BY A SINGLE FUNCTIONAL CHIP

(71) Applicant: RICHTEK TECHNOLOGY CORP., Hsinchu County (TW)

(72) Inventors: Tsung-Han Yang, Kaohsiung (TW); Yen-Chih Wang, New Taipei (TW); Ming-Jun Hsiao, Hsinchu County (TW); Tsung-Nan Wu, Hsinchu County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 199 days.

(21) Appl. No.: 18/079,011

(22) Filed: Dec. 12, 2022

(65) Prior Publication Data

US 2024/0155292 A1 May 9, 2024

(30) Foreign Application Priority Data

Nov. 4, 2022 (TW) ................................. 111142247

(51) Int. Cl.
*H04R 3/12* (2006.01)
*H04R 1/24* (2006.01)
*H04R 3/04* (2006.01)
*H04R 5/04* (2006.01)

(52) U.S. Cl.
CPC ................ *H04R 3/12* (2013.01); *H04R 1/24* (2013.01); *H04R 3/04* (2013.01); *H04R 5/04* (2013.01)

(58) Field of Classification Search
None
See application file for complete search history.

(56) References Cited

U.S. PATENT DOCUMENTS

| | | | | |
|---|---|---|---|---|
| 2019/0141446 | A1 | 5/2019 | Moritoki | |
| 2020/0084542 | A1 * | 3/2020 | Ding | H03G 3/3005 |

FOREIGN PATENT DOCUMENTS

| | | | |
|---|---|---|---|
| CN | 105103568 | A | 11/2015 |
| CN | 110121131 | A | 8/2019 |
| CN | 209593735 | U | 11/2019 |
| CN | 113287327 | A | 8/2021 |
| CN | 113840210 | A | 12/2021 |

* cited by examiner

*Primary Examiner* — Kenny H Truong
(74) *Attorney, Agent, or Firm* — Winston Hsu

(57) ABSTRACT

An electronic device includes two speakers, a single functional chip, a parameter extraction circuit, an audio processing module, a gain adjusting circuit and a current detecting unit. The current detecting unit is disposed in the functional chip for detecting the driving current of the two speakers. The functional chip provides the driving voltage of the two speakers based on an output signal and converts the analogue current/voltages of the two speakers into digital current/voltages. The parameter extraction circuit acquires the parameter of each speaker based on the digital current/voltages. The audio processing module acquires the gains of various physical quantities based on the parameter of each speaker and determines the final gain of each physical quantity. The gain adjusting circuit provides the output signal by adjusting the gain of an input signal based on the final gain of each physical quantity.

9 Claims, 5 Drawing Sheets

ELECTRONIC DEVICE HAVING MULTIPLE SPEAKERS CONTROLLED BY A SINGLE FUNCTIONAL CHIP

BACKGROUND OF THE INVENTION

1. Field of the Invention

The present invention is related to an electronic device having multiple speakers controlled by a single functional chip, and more particularly, to an electronic device having multiple speakers controlled by a single functional chip and capable of optimizing the performance of each speaker and providing individual protection for each speaker.

2. Description of the Prior Art

A speaker is an electronic device capable of converting electrical signals into audio signals and normally includes diaphragms and a control circuit made of electromagnets and coils. When the current of the speaker control signal corresponding to a specific frequency flows through the coils in the speaker, the coils vibrate in the same frequency of the current. The diaphragms attached to the coils also start to vibrate, thereby causing disturbance in surrounding air for producing sound. The speaker control signal may be provided by a smart audio amplifier chip which adopts protective algorithms to ensure that each physical quantity of the speaker during operation (such as temperature, voltage, current or excursion) is within its nominal range, thereby allowing the speaker to operate safely.

An electronic device may adopt multiple speakers to provide sufficient sound effects in certain applications. When a single functional chip is used to control multiple speakers, the protective algorithm can only be executed according to the total current and the total voltage of the multiple speakers. In other words, since the prior art functional chip is unable to acquire the physical quantity of each speaker during operation based on the individual current and the individual voltage of each speaker, it fails to provide individual protection for each speaker.

Therefore, in an electronic device having multiple speakers controlled by a single functional chip, there is a need to optimize the performance of each speaker and provide individual protection for each speaker.

SUMMARY OF THE INVENTION

The present invention provides an electronic device having multiple speakers controlled by a single functional chip. The electronic device includes a first speaker, a second speaker, the single functional chip having an amplifier, a first current-sensing unit and first through third analog-to-digital converters, a second current-sensing unit and a controller having a judging circuit, a parameter extraction circuit and an audio processing module. The first speaker is configured to operate according to a driving voltage. The second speaker is coupled in parallel with the first speaker and configured to operate according to the driving voltage. The amplifier is configured to convert an output signal into the driving voltage. The first current-sensing unit is configured to detect a driving current which is equal to a sum of a first current flowing through the first speaker and a second current flowing through the second speaker. The first analog-to-digital converter is coupled to the first current-sensing unit and configured to convert the driving current into a first signal. The second analog-to-digital converter is configured to convert the second current into a second signal. The third analog-to-digital converter is coupled in parallel with the first speaker and configured to convert the driving voltage into a third signal. The second current-sensing unit is coupled to the second speaker and configured to detect the second current flowing through the second speaker. The judging circuit is coupled to the first analog-to-digital converter for receiving the first signal and coupled to the second analog-to-digital converter for receiving the second signal, and configured to provide a fourth signal associated with the first current flowing through the first speaker by acquiring a difference between the first signal and the second signal. The parameter extraction circuit is configured to acquire at least one first parameter of the first speaker and at least one second parameter of the second speaker based on the second signal, the third signal and the fourth signal. The audio processing module is configured to receive an input signal, adjust a gain of the input signal based on the at least one first parameter and the at least one second parameter, and provide the output signal by amplifying the input signal with the gain.

The present invention also provides an electronic device having multiple speakers controlled by a single functional chip. The electronic device includes a first speaker, a second speaker, the single functional chip having an amplifier, a current-sensing unit and first through third analog-to-digital converters, and a controller having a judging circuit, a parameter extraction circuit and an audio processing module. The first speaker is configured to operate according to a driving voltage. The second speaker is coupled in series to the first speaker and configured to operate according to the driving voltage. The amplifier is configured to convert an output signal into the driving voltage. The current-sensing unit is configured to detect a driving current flowing through the first speaker and the second speaker. The first analog-to-digital converter is coupled in parallel with the first speaker and the second speaker and configured to convert a voltage established across the first speaker and the second speaker into a first signal. The second analog-to-digital converter is coupled in parallel with the second speaker and configured to convert a voltage established across the second speaker into a second signal. The third analog-to-digital converter is coupled to the current-sensing unit and configured to convert the driving current into a third signal. The judging circuit is coupled to the first analog-to-digital converter for receiving the first signal and coupled to the second analog-to-digital converter for receiving the second signal, and configured to provide a fourth signal associated with a voltage established across the first speaker by acquiring a difference between the first signal and the second signal. The parameter extraction circuit is configured to acquire at least one first parameter of the first speaker and at least one second parameter of the second speaker based on the second signal, the third signal and the fourth signal. The audio processing module is configured to receive an input signal, adjust a gain of the input signal based on the at least one first parameter and the at least one second parameter, and provide the output signal by amplifying the input signal with the gain.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
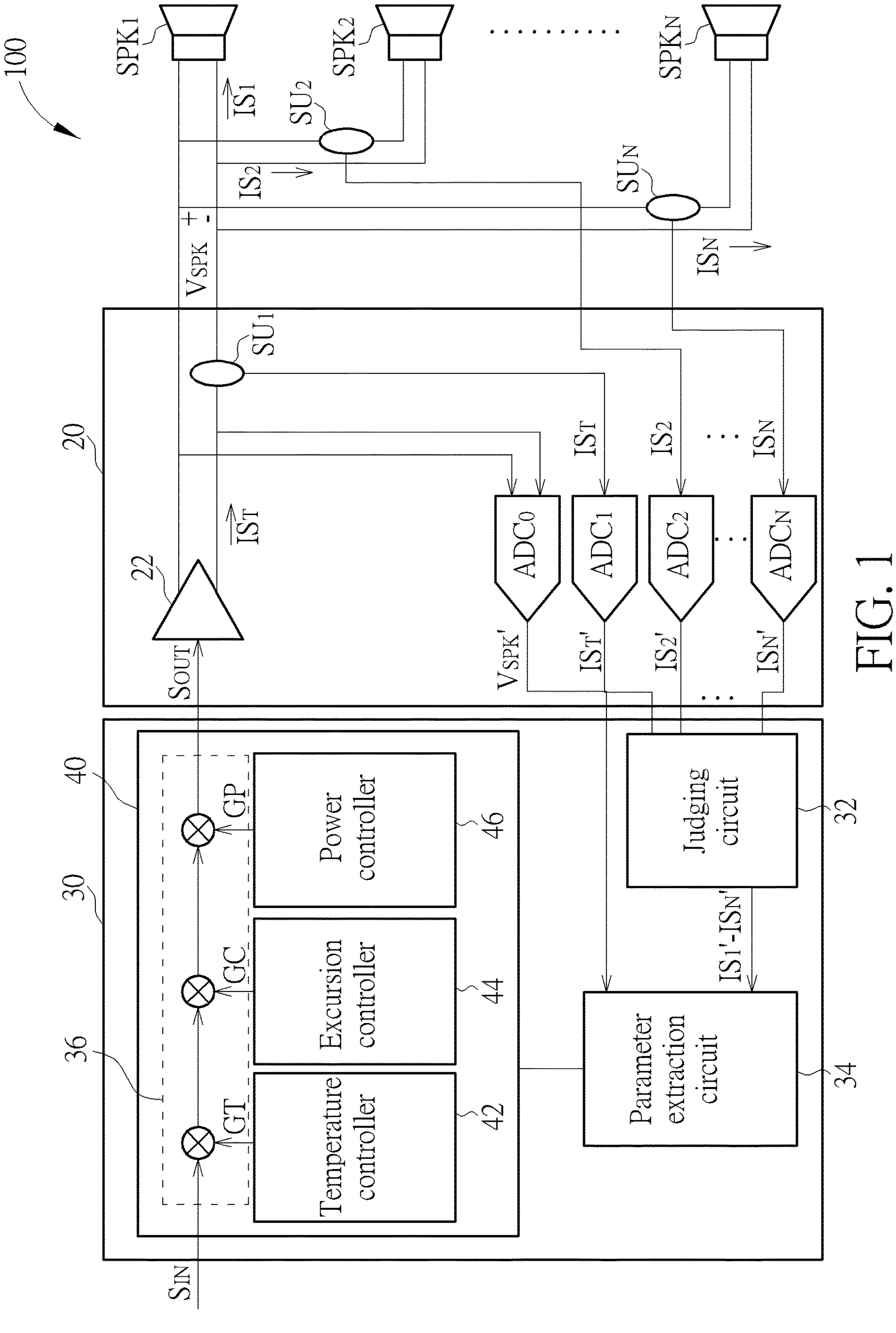
FIG. 1 is a functional diagram illustrating a functional diagram of an electronic device according to an embodiment of the present invention.
Figure 2:
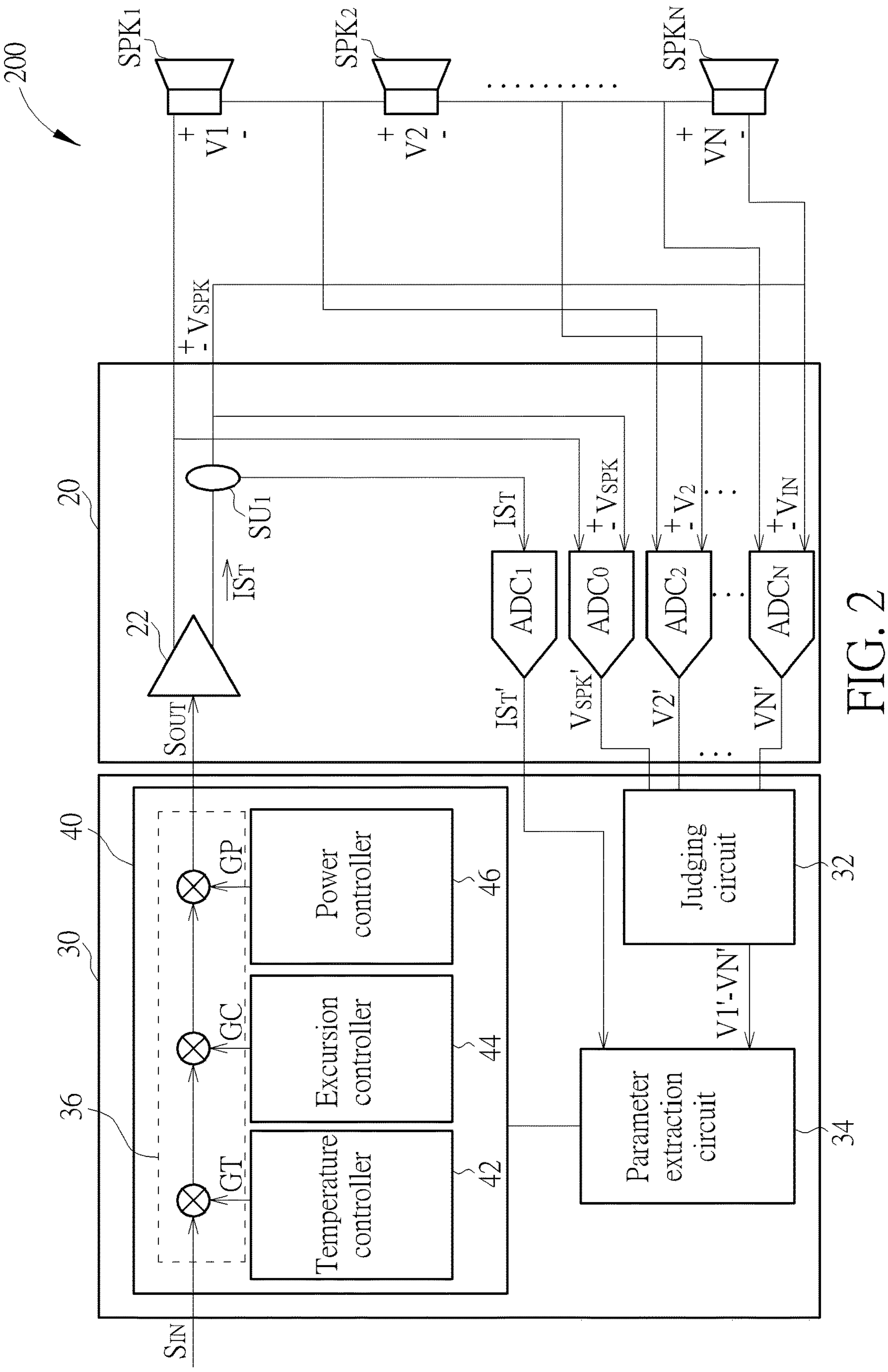
FIG. 2 is a functional diagram illustrating a functional diagram of an electronic device according to another embodiment of the present invention.

FIG. 1 is a functional diagram illustrating a functional diagram of an electronic device 100 according to an embodiment of the present invention. FIG. 2 is a functional diagram illustrating a functional diagram of an electronic device 200 according to another embodiment of the present invention. Each of the electronic devices 100 and 200 includes multiple speakers $SPK_1$-$SPK_N$, one or multiple current-sensing units $SU_1$-$SU_M$, a functional chip 20 and a controller 30, wherein N is an integer larger than 1 and M is a positive integer. For illustrative purpose, V1-VN respectively represent the voltages established across the speakers $SPK_1$-$SPK_N$, $IS_1$-$IS_N$ respectively represent the current flowing through the speakers $SPK_1$-$SPK_N$, $V_{SPK}$ represents the driving voltage of the speakers $SPK_1$-$SPK_N$, and $IS_T$ represents the driving current of the speakers $SPK_1$-$SPK_N$.

In the present invention, the speakers $SPK_1$-$SPK_N$ may include speakers of the same type or include different types of speakers. In an embodiment, each speaker may be a dynamic speaker, an electromagnet speaker, a piezoelectric speaker, an electrostatic speaker or a plasma speaker. In an embodiment, each speaker may be a woofer, a subwoofer, a mid-range speaker, a tweeter, a super tweeter, a coaxial speaker or a full-range speaker. However, the types of the speakers $SPK_1$-$SPK_N$ do not limit the scope of the present invention.

In the electronic device 100 depicted in FIG. 1, the speakers $SPK_1$-$SPK_N$ are coupled in parallel with each other, wherein the first input ends of the speakers $SPK_1$-$SPK_N$ are coupled together and the second input ends of the speakers $SPK_1$-$SPK_N$ are coupled together. In the parallel configuration, each speaker is configured to operate according the driving voltage $V_{SPK}$ (V1=V2= . . . =VN=$V_{SPK}$). In the electronic device 100, the number of the current-sensing units $SU_1$-$SU_M$ is equal to the number of the speakers $SPK_1$-$SPK_N$ (M=N). The current-sensing unit $SU_1$ is disposed in the functional chip 20 and coupled to the speaker $SPK_1$, while the current-sensing units $SU_2$-$SU_M$ are disposed outside the functional chip 20 and coupled to the speakers $SPK_1$-$SPK_N$, respectively. The current-sensing unit $SU_1$ is configured to detect the sum of the current $IS_1$-$IS_N$ flowing through the speakers $SPK_1$-$SPK_N$ (i.e., the driving current $IS_T$), and the current-sensing units $SU_2$-$SU_M$ are configured to respectively detect the current $IS_2$-$IS_N$ flowing through the speakers $SPK_2$-$SPK_N$, wherein $IS_T$=$IS_1$+$IS_2$+ . . . +$IS_N$.

In the electronic device 200 depicted in FIG. 2, the speakers $SPK_1$-$SPK_N$ are coupled in a series to each other, wherein the second input end of the speaker $SPK_1$ is coupled to the first input end of the speaker $SPK_2$, the second input end of the speaker $SPK_2$ is coupled to the first input end of the speaker $SPK_3$, etc. In the series configuration, the speakers $SPK_1$-$SPK_N$ are configured to operate according the voltages V1-VN, respectively, wherein V1+V2+ . . . +VN=$V_{SPK}$. The electronic device 200 includes one current-sensing unit $SU_1$ (M=1), wherein the current-sensing unit $SU_1$ is disposed in the functional chip 20 and coupled to the speaker $SPK_1$. The current-sensing unit $SU_1$ is configured to detect the sum of the current $IS_1$-$IS_N$ flowing through the speakers $SPK_1$-$SPK_N$ (i.e., the driving current IST), wherein $IS_T$=$IS_1$+$IS_2$+ . . . +$IS_N$.

In an embodiment of the present invention, each of the current-sensing units $SU_1$-$SU_M$ may include a precise resistor, a capacitor and/or an inductor. However, the implementation of the current-sensing units $SU_1$-$SU_M$ does not limit the scope of the present invention.

In the present invention, the functional chip 20 may be a smart audio amplifier chip which includes an amplifier 22, the current-sensing unit $SU_1$, and multiple analog-to-digital converters $ADC_0$-$ADC_N$. The amplifier 22 includes an input end coupled to the controller 30 for receiving an output signal $S_{OUT}$, a first output end coupled to the first input ends of the speakers $SPK_1$-$SPK_N$, and a second output end coupled to the second input ends of the speakers $SPK_1$-$SPK_N$. The functional chip 20 is configured to provide the driving voltage $V_{SPK}$ for the speakers $SPK_1$-$SPK_N$ by amplifying the output signal $S_{OUT}$.

In the electronic device 100 depicted in FIG. 1, the analog-to-digital converter $ADC_0$ is coupled to the two output ends of the amplifier 22 and configured to convert the analog driving voltage $V_{SPK}$ into a digital driving voltage $V_{SPK}$'. The analog-to-digital converter $ADC_1$ is coupled to the current-sensing unit $SU_1$ and configured to convert the analog driving current $IS_T$ flowing through the speakers $SPK_1$-$SPK_N$ into a digital driving current $IS_T$'. The analog-to-digital converters $ADC_2$-$ADC_N$ are respectively coupled to the current-sensing units $SU_2$-SUN and configured to convert the analog current $IS_2$-$IS_N$ flowing through the speakers $SPK_2$-$SPK_N$ into digital current $IS_2$'-$IS_N$', respectively.

In the electronic device 200 depicted in FIG. 2, the analog-to-digital converter $ADC_0$ is coupled to the current-sensing unit $SU_1$ and configured to convert the analog driving current $IS_T$ into a digital driving current $IS_T$'. The analog-to-digital converter ADC 1 is coupled to the two output ends of the amplifier 22 and configured to convert the analog driving voltage $V_{SPK}$ into a digital driving voltage $V_{SPK}$. The analog-to-digital converters $ADC_2$-$ADC_N$ are respectively coupled in parallel with the speakers $SPK_2$-$SPK_N$ and configured to convert the analog voltages V1-VN into digital voltages V1'-VN', respectively.

In the present invention, the controller 30 includes a judging circuit 32, a parameter extraction circuit 34, a gain-adjusting circuit 36, and an audio processing module 40. The controller 30 is configured to receive the input signal SIN and provide the corresponding output signal $S_{OUT}$ by processing the input signal SIN. The judging circuit 32 is configure to acquire digital current $IS_1$'-$IS_N$' or digital voltages V1'-VN' respectively associated with the speakers $SPK_1$-$SPK_N$ according to the data provided by the functional chip 20.

In the electronic device 100 depicted in FIG. 1, the judging circuit 32 is configured to receive the digital current $IS_T$' and $IS_2$'-$IS_N$' provided by the analog-to-digital converters $ADC_1$-$ADC_N$ of the functional chip 20, and acquire the digital current $IS_1$' associated with the analog current $IS_1$ flowing through the speaker $SPK_1$, wherein $IS_1$'=$IS_T$'–$IS_2$'– . . . –$IS_N$'. Therefore, the parameter extraction circuit 34 may be informed of the digital voltages V1'-VN' respectively associated with the voltages established across the speakers $SPK_1$-$SPK_N$ and the digital current $IS_1$'-$IS_N$ associated with the current flowing through the speakers $SPK_1$-$SPK_N$.

In the electronic device 200 depicted in FIG. 2, the judging circuit 32 is configured to receive the digital voltages $V_{SPK}$ and V2'-VN' provided by the analog-to-digital converters $ADC_1$-$ADC_N$ of the functional chip 20, and acquire the digital voltage V1' associated with the speaker $SPK_1$, wherein $V1'=V_{SPK}-V2'-\ldots-VN'$. Therefore, the parameter extraction circuit 34 may be informed of the digital voltages V1'-VN' respectively associated with the analog voltages V1-VN established across the speakers $SPK_1$-$SPK_N$ and the digital current $IS_1$'-$IS_N$' associated with the current flowing through the speakers $SPK_1$-$SPK_N$ ($IS_1'=IS_2'=\ldots=IS_N'=IS_T'$).

In an embodiment of the present invention, the parameter extraction circuit 34 is configured to acquire the parameter of each speaker based on the digital voltages V1'-VN' and the digital current $IS_1$'-$IS_N$'. The above-mentioned parameter may be the Thiele/Small (TS) parameter of each speaker, such as the direct-current (DC) impedance RDC, the resonant frequency w0, the mechanical quality factor $Q_{MS}$, the electrical quality factor $Q_{ES}$, the total quality factor $Q_{TS}$, or the force factor of each speaker. The force factor of a speaker is equal to a multiple of the magnet flux density of the speaker and the coil length of the speaker. Based on the above-mentioned parameter, the parameter extraction circuit 34 may acquire the impedance curve Z(s) of each speaker, depicted as follows:

$$\begin{aligned} Z(s) &= V(s)/I(s) \\ &= R_{DC} * \left(s^2/w_0^2 + s/(Q_{TS} * w_0) + 1\right)/\left(s^2/w_0^2 + s/(Q_{MS} * w_0) + 1\right) \end{aligned}$$

In the present invention, the audio processing module 40 is configured to acquire the gains of various physical quantities based on the parameter of each speaker among the speakers $SPK_1$-$SPK_N$ and determine the final gain of each physical quantity, such as the final temperature gain, the final excursion gain, and/or the final power gain.

Figure 3:
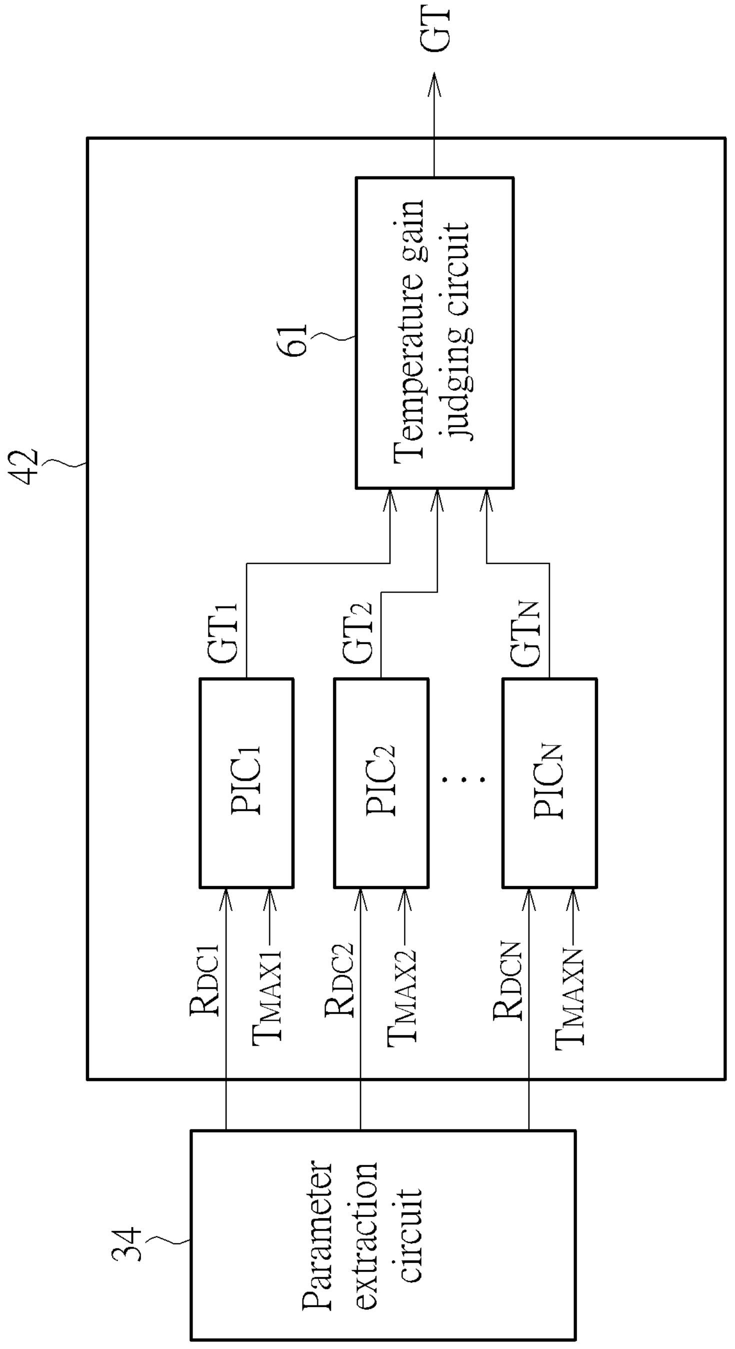
FIG. 3 is a functional diagram illustrating the temperature controller in the audio processing module of an electronic device according to an embodiment of the present invention.
Figure 4:
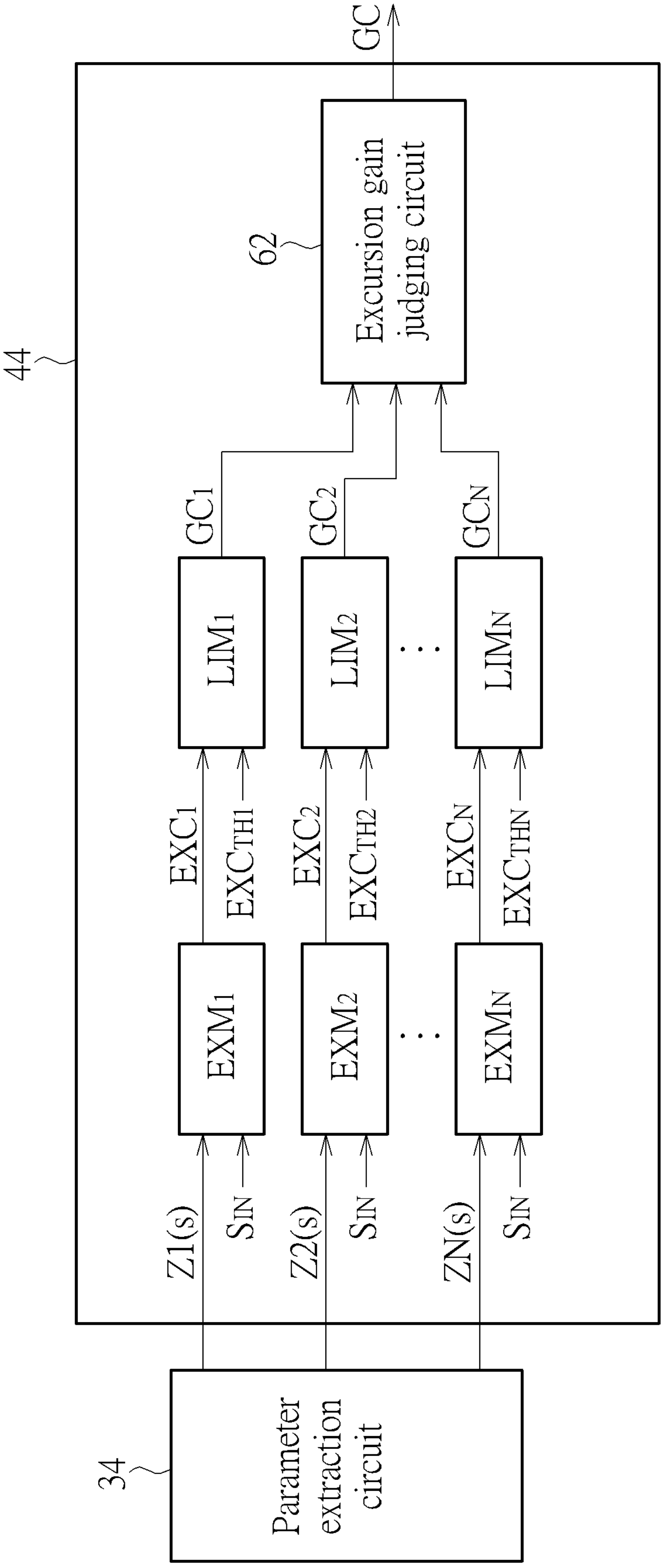
FIG. 4 is a functional diagram illustrating the excursion controller in the audio processing module of an electronic device according to an embodiment of the present invention.
Figure 5:
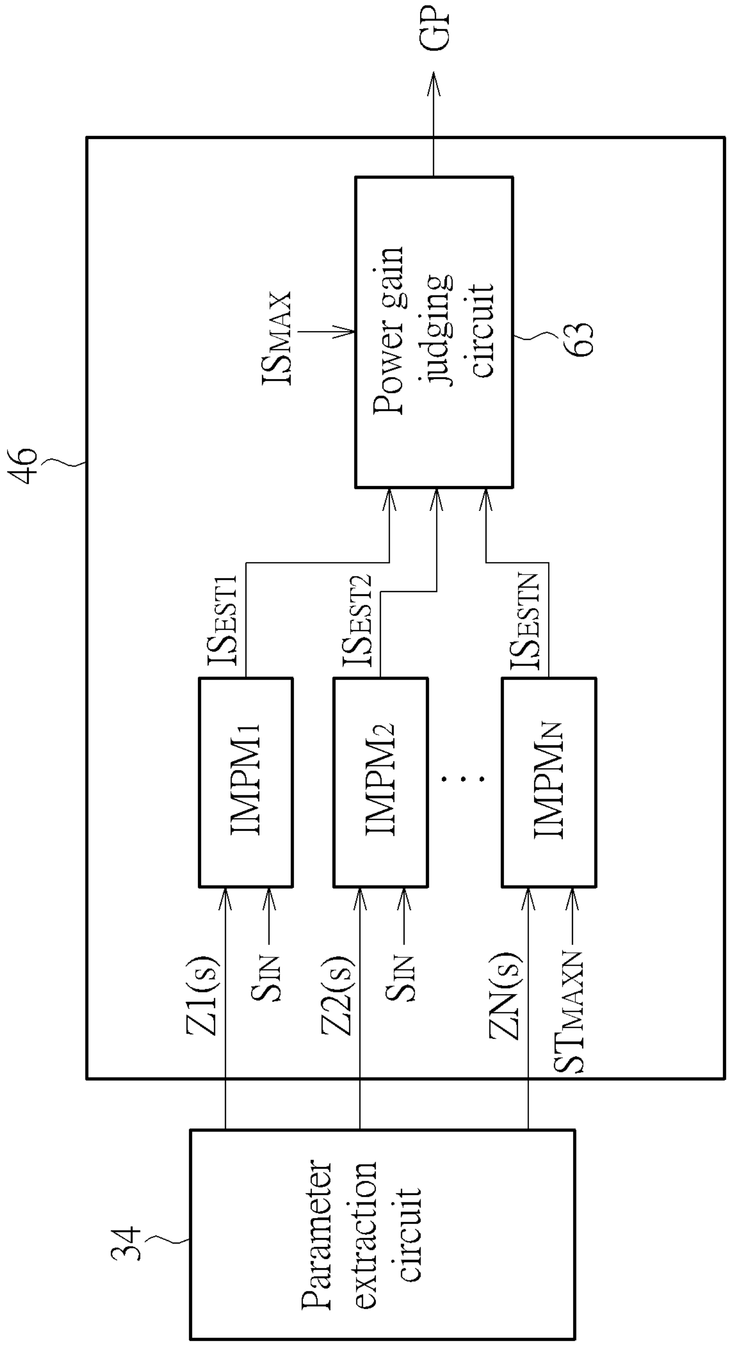
FIG. 5 is a functional diagram illustrating the power controller in the audio processing module of an electronic device according to an embodiment of the present invention.

In an embodiment of the present invention, the audio processing module 40 includes a temperature controller 42, an excursion controller 44, and a power controller 46. FIG. 3 is a functional diagram illustrating the temperature controller 42 in the audio processing module 40 according to an embodiment of the present invention. FIG. 4 is a functional diagram illustrating the excursion controller 44 in the audio processing module 40 according to an embodiment of the present invention. FIG. 5 is a functional diagram illustrating the power controller 46 in the audio processing module 40 according to an embodiment of the present invention.

As depicted in FIG. 3, the temperature controller 42 includes a plurality of proportional-integral controllers $PIC_1$-$PIC_N$ and a temperature gain judging circuit 61. The proportional-integral controllers $PIC_1$-$PIC_N$ are configured to respectively receive the DC impedance $R_{DC1}$-$R_{DCN}$ of the speakers $SPK_1$-$SPK_N$ from the parameter extraction circuit 34 and acquire the individual temperature gains $GT_1$-$GT_N$ of the speakers $SPK_1$-$SPK_N$ based on the relationship between the predetermined temperature thresholds $T_{MAX1}$-$T_{MAXN}$ of the speakers $SPK_1$-$SPK_N$ under the current temperature and the DC impedance $R_{DC1}$-$R_{DCN}$. The temperature gain judging circuit 61 is configured to determine the values of the individual temperature gains $GT_1$-$GT_N$ and output the smallest individual temperature gain as the final temperature gain GT.

As depicted in FIG. 4, the excursion controller 44 includes a plurality of excursion models $EXM_1$-$EXM_N$ respectively associated the operation of the speakers $SPK_1$-$SPK_N$, a plurality of limiters $LIM_1$-$LIM_N$, and an excursion gain judging circuit 62. The excursion models $EXM_1$-$EXM_N$ are configured to respectively receive the DC impedance curves Z1(*s*)-ZN(s) of the speakers $SPK_1$-$SPK_N$ from the parameter extraction circuit 34 and acquire the current excursion values $EXC_1$-$EXC_N$ of the speakers $SPK_1$-$SPK_N$ based on the input signal $S_{IN}$ and the DC impedance curves Z1(*s*)-ZN(s). The limiters $LIM_1$-$LIM_N$ are configured to respectively receive the current excursion values $EXC_1$-$EXC_N$ and acquire the individual excursion gains $GC_1$-$GC_N$ of the speakers $SPK_1$-$SPK_N$ based on the relationship between the predetermined excursion thresholds $EXC_{TH1}$-$EXC_{THN}$ of the speakers $SPK_1$-$SPK_N$ and the current excursion values $EXC_1$-$EXC_N$. The excursion gain judging circuit 62 is configured to determine the values of the individual excursion gains $GC_1$-$GC_N$ and output the smallest individual excursion gain as the final excursion gain GC.

As depicted in FIG. 5, the power controller 46 includes a plurality of impedance models $IMPM_1$-$IMPM_N$ respectively associated the operation of the speakers $SPK_1$-$SPK_N$, and an power gain judging circuit 63. The impedance models $IMPM_1$-$IMPM_N$ are configured to respectively receive the DC impedance curves Z1(*s*)-ZN(s) of the speakers $SPK_1$-$SPK_N$ from the parameter extraction circuit 34 and acquire the current estimated current values $IS_{EST1}$-$IS_{ESTN}$ of the speakers $SPK_1$-$SPK_N$ based on the input signal $S_{IN}$ and the DC impedance curves Z1(*s*)-ZN(s). The power gain judging circuit 63 is configured to receive the current estimated current values $IS_{EST1}$-$IS_{ESTN}$ of the speakers $SPK_1$-$SPK_N$ and provide the final power gain GP according to the sum of the current estimated current values $I_{SEST1}$-$IS_{ESTN}$ of the speakers $SPK_1$-$SPK_N$. In an embodiment, the power gain judging circuit 63 is a limiter configured to output the sum of the current estimated current values $I_{SEST1}$-$IS_{ESTN}$ as the final power gain GP when the sum of the current estimated current values $I_{SEST1}$-$IS_{ESTN}$ is smaller than a maximum current threshold $IS_{MAX}$ and output the maximum current threshold $IS_{MAX}$ as the final power gain GP when the sum of the current estimated current values $IS_{EST1}$-$IS_{ESTN}$ is not smaller than the maximum current threshold $IS_{MAX}$.

In the present invention, the gain adjusting circuit 36 can adjust the gain of the input signal $S_{IN}$ based on the final temperature gain GT, the final excursion gain GC, and/or the final power gain GT, thereby providing the output signal $S_{OUT}$.

In conclusion, in an electronic device having multiple speakers controlled by a single functional chip, the present invention can monitor the operational status of each speaker and adjust the driving voltage $V_{SPK}$ accordingly. Therefore, the present invention can optimize the performance of each speaker and provide individual protection for each speaker.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having multiple speakers controlled by a single functional chip, comprising:

a first speaker configured to operate according to a driving voltage;

a second speaker coupled in parallel with the first speaker and configured to operate according to the driving voltage;

the single functional chip, comprising:

an amplifier configured to convert an output signal into the driving voltage;

a first current-sensing unit configured to detect a driving current which is equal to a sum of a first current flowing through the first speaker and a second current flowing through the second speaker;

a first analog-to-digital converter coupled to the first current-sensing unit and configured to convert the driving current into a first signal;

a second analog-to-digital converter configured to convert the second current into a second signal; and a third analog-to-digital converter coupled in parallel with the first speaker and configured to convert the driving voltage into a third signal;

a second current-sensing unit coupled to the second speaker and configured to detect the second current flowing through the second speaker; and a controller, comprising:

a judging circuit coupled to the first analog-to-digital converter for receiving the first signal and coupled to the second analog-to-digital converter for receiving the second signal, and configured to provide a fourth signal associated with the first current flowing through the first speaker by acquiring a difference between the first signal and the second signal; and a parameter extraction circuit configured to acquire at least one first parameter of the first speaker and at least one second parameter of the second speaker based on the second signal, the third signal and the fourth signal; and an audio processing module configured to:

receive an input signal;

adjust a gain of the input signal based on the at least one first parameter and the at least one second parameter; and provide the output signal by amplifying the input signal with the gain.

2. The electronic device of claim 1, wherein:

the at least one first parameter is a first direct-current (DC) impedance, a first resonant frequency, a first mechanical quality factor, a first electrical quality factor, a first total quality factor or a first force factor of the first speaker;

the at least one second parameter is a second DC impedance, a second resonant frequency, a second mechanical quality factor, a second electrical quality factor, a second total quality factor or a second force factor of the second speaker;

the first force factor of the first speaker is equal to a multiple of a first magnet flux density of the first speaker and a first coil length of the first speaker; and the second force factor of the second speaker is equal to a multiple of a second magnet flux density of the second speaker and a second coil length of the second speaker.

3. The electronic device of claim 1, wherein:

the at least one first parameter is a first DC impedance of the first speaker;

the at least one second parameter is a second DC impedance of the second speaker;

the audio processing module comprises a temperature controller coupled to the parameter extraction circuit for receiving the first DC impedance and the second DC impedance, and configured to:

acquire a first individual temperature gain associated with the first DC impedance and a second individual temperature gain associated with the second DC impedance;

output the first individual temperature gain as a final temperature gain when the first individual temperature gain is smaller than the second individual temperature gain; and output the second individual temperature gain as a final temperature gain when the second individual temperature gain is smaller than the smaller individual temperature gain; and the audio processing module is further configured to adjust the gain of the input signal based on the final temperature gain.

4. The electronic device of claim 3, wherein the temperature controller comprises:

a first proportional integral (PI) controller configured to acquire the first individual temperature gain based on the first DC impedance and a first predetermined temperature threshold associated with the first speaker; and a second PI controller configured to acquire the second individual temperature gain based on the second DC impedance and a second predetermined temperature threshold associated with the second speaker.

5. The electronic device of claim 1, wherein:

the at least one first parameter is a first impedance curve of the first speaker;

the at least one second parameter is a second impedance curve of the second speaker;

the audio processing module comprises an excursion controller coupled to the parameter extraction circuit for receiving the first impedance curve and the second impedance curve, and configured to:

acquire a first individual excursion gain associated with the first impedance curve and a second individual excursion gain associated with the second impedance curve;

output the first individual excursion gain as a final excursion gain when the first individual excursion gain is smaller than the second individual excursion gain; and output the second individual excursion gain as a final excursion gain when the second individual excursion gain is smaller than the smaller individual excursion gain; and the audio processing module is further configured to adjust the gain of the input signal based on the final excursion gain.

6. The electronic device of claim 5, wherein the excursion controller comprises:

a first excursion model configured to acquire a first excursion value based on the first impedance curve and the input signal; and a second excursion model configured to acquire a second excursion value based on the second impedance curve and the input signal.

7. The electronic device of claim 6, wherein the excursion controller further comprises:

a first limiter configured to acquire the first individual excursion gain based on the first excursion value and a first predetermined excursion threshold associated with the first speaker; and a second limiter configured to acquire the second individual excursion gain based on the second excursion value and a second predetermined excursion threshold associated with the second speaker.

8. The electronic device of claim 1, wherein:

the at least one first parameter is a first impedance curve of the first speaker;

the at least one second parameter is a second impedance curve of the second speaker;

the audio processing module comprises a power controller coupled to the parameter extraction circuit for receiving the first impedance curve and the second impedance curve, and configured to:

acquire a first estimated current value associated with the first speaker based on the input signal and the first impedance curve;

acquire a second estimated current value associated with the second speaker based on the input signal and the second impedance curve;

output a sum of the first estimated current value and the second estimated current value as a final power gain when the sum of the first estimated current value and the second estimated current value is not larger than a maximum current threshold; and output the maximum current threshold as the final power gain when the sum of the first estimated current value and the second estimated current value is larger than the maximum current threshold; and the audio processing module is further configured to adjust the gain of the input signal based on the final power gain.

9. The electronic device of claim 8, wherein the power controller comprises:

a first impedance model configured to acquire the first estimated current value based on the first impedance curve and the input signal; and a second impedance model configured to acquire the second estimated current value based on the second impedance curve and the input signal.

* * * * *